US012812556B2

(12) United States Patent
Phan et al.

(10) Patent No.: US 12,812,556 B2
(45) Date of Patent: Nov. 24, 2026

(54) AUTONOMOUS POWER REGULATION (APR) METHOD

(71) Applicant: METTEL GROUP, Ha Noi City (VN)

(72) Inventors: Dang Minh Phan, Ho Chi Minh City (VN); Xuan Hao Luong, Ha Noi City (VN); Trung Tien Nguyen, Ha Noi City (VN); Van Hoan Duong, Ha Noi City (VN); Quoc Anh Huynh, Phu Tan District (VN); Huu Tung Nguyen, My Hao District (VN); Minh Quan Lam, Ho Chi Minh City (VN); Huy Anh Pham, Vinh Yen City (VN); Minh Tuan Nguyen, Ha Noi City (VN); Quang Huy Phan, Da Nang City (VN)

(73) Assignee: VIETTEL GROUP, Ha Noi City (VN)

( * ) Notice: Subject to any disclaimer, the term of this patent is extended or adjusted under 35 U.S.C. 154(b) by 184 days.

(21) Appl. No.: 18/942,999

(22) Filed: Nov. 11, 2024

(65) Prior Publication Data

US 2025/0212132 A1 Jun. 26, 2025

(30) Foreign Application Priority Data

Dec. 26, 2023 (VN) .............................. 1-2023-09268

(51) Int. Cl.

| | |
|---|---|
| ***H04W 52/24*** | (2009.01) |
| ***H04L 27/01*** | (2006.01) |
| ***H04L 27/26*** | (2006.01) |
| ***H04W 52/52*** | (2009.01) |

(52) U.S. Cl.
CPC ........... *H04W 52/245* (2013.01); *H04L 27/01* (2013.01); *H04L 27/2613* (2013.01); *H04W 52/52* (2013.01)

(58) Field of Classification Search
CPC .... H04W 52/245; H04W 52/52; H04L 27/01; H04L 27/2613
USPC ........................................................... 455/522
See application file for complete search history.

(56) References Cited

U.S. PATENT DOCUMENTS

| | | | | |
|---|---|---|---|---|
| 6,483,957 | B1 * | 11/2002 | Hamerly | H04B 10/2569 385/11 |
| 9,699,663 | B1 * | 7/2017 | Jovancevic | G01S 7/021 |
| 10,630,410 | B2 * | 4/2020 | Parkvall | H04B 7/0452 |
| 11,424,539 | B2 * | 8/2022 | Alpman | H01Q 9/0414 |

(Continued)

*Primary Examiner* — April G Gonzales
(74) *Attorney, Agent, or Firm* — patenttm.us

(57) ABSTRACT

An autonomous power regulation method enhances quality of the received signal under severe conditions such as weak signal, unbalanced power among antennas, and not identical power among subcarriers. The improvement in signal quality also means the better performance of the physical uplink control channel format two in the fifth generation mobile network. In terms of antenna index, symbol index, and subcarrier type, power of the received signal is autonomously compensated as the following four steps: step 1: sequence generation and reference calculation; step 2: signal extraction and magnitude calculation; step 3: threshold generation, gain calculation, and power regulation; step 4: channel estimation, channel equalization, channel decoder, and statistics. With various types of the received signal power level and wide range of signal-to-noise ratio, the provided experiment results prove that the autonomous power regulation method is effective, reliable, and versatile.

1 Claim, 6 Drawing Sheets

(56) References Cited

U.S. PATENT DOCUMENTS 11,452,032 B2 * 9/2022 Gupta ................... H04W 48/16
11,552,754 B2 * 1/2023 Hunukumbure .. H04W 72/0453
11,575,477 B2 * 2/2023 Moroga ................. H04B 1/713
11,576,205 B2 * 2/2023 Xue ...................... H04W 16/14
11,582,761 B2 * 2/2023 Venugopal ............... H04B 7/01
11,617,202 B2 * 3/2023 Myung ................. H04L 5/0007 370/329
11,626,948 B2 * 4/2023 Kwak .................... H04B 7/088 370/329
11,728,957 B2 * 8/2023 Loehr ................... H04L 5/0098 370/329
11,765,741 B2 * 9/2023 Gao .......................... H04L 1/00 370/336
11,825,469 B2 * 11/2023 Yang ..................... H04L 5/0044
11,844,097 B2 * 12/2023 Taherzadeh Boroujeni ................ H04L 27/26134
11,917,685 B2 * 2/2024 Li ..................... H04L 27/26025
11,930,389 B2 * 3/2024 Berger .................. H04L 1/0053
11,949,617 B2 * 4/2024 Wang .................... H04L 5/0042
11,956,762 B2 * 4/2024 Nammi ................. H04L 5/0035
12,096,263 B2 * 9/2024 Ai ......................... H04L 1/0026
12,101,653 B2 * 9/2024 Wu ...................... H04B 7/0626
12,144,025 B2 * 11/2024 Baldemair ............ H04L 1/1887
12,160,886 B2 * 12/2024 Wu ..................... H04W 74/004
2005/0101264 A1 * 5/2005 Farlow ................. H04B 7/0874 455/84
2014/0334434 A1 * 11/2014 Bhattad .................. H04J 11/005 370/329
2018/0324708 A1 * 11/2018 Cheng ................... H04W 88/10
2019/0175079 A1 * 6/2019 Nishida .............. A61B 5/14532
2019/0175080 A1 * 6/2019 Varsavsky .......... A61B 5/14865
2020/0284883 A1 * 9/2020 Ferreira .................. G01S 7/497
2021/0041841 A1 * 2/2021 Jasmin ................... G05B 15/02
2021/0157312 A1 * 5/2021 Cella ................... G01M 13/028
2022/0014337 A1 * 1/2022 Ouchi ............... H04W 74/0808
2022/0108262 A1 * 4/2022 Cella ...................... G01N 29/14
2022/0353879 A1 * 11/2022 Choi ..................... H04L 5/0057
2023/0114410 A1 * 4/2023 Jang ...................... H04L 1/0016 370/329
2023/0122075 A1 * 4/2023 Lin .................... H04B 7/06952 370/329
2023/0189164 A1 * 6/2023 Seo ..................... H04W 52/146 455/522
2023/0262614 A1 * 8/2023 Park .................... H04W 52/365 455/522
2023/0273291 A1 * 8/2023 Ozturk .................... G01S 7/006 342/52
2023/0283429 A1 * 9/2023 Park ...................... H04L 1/0016 370/329
2023/0345576 A1 * 10/2023 Lee ..................... H04L 27/2602
2024/0040521 A1 * 2/2024 Fu ....................... H04W 52/245
2024/0056340 A1 * 2/2024 Muralidhar ........... H04L 27/261
2024/0057078 A1 * 2/2024 Fu ......................... H04L 5/0035
2024/0073842 A1 * 2/2024 Myung .............. H04B 7/18513
2024/0155608 A1 * 5/2024 Park ...................... H04L 1/1812
2024/0362994 A1 * 10/2024 Daoura .................. G08C 17/02
2026/0145376 A1 * 5/2026 Hoang ................ B29C 48/0011

* cited by examiner

AUTONOMOUS POWER REGULATION (APR) METHOD

FIELD OF THE INVENTION

The invention proposes an Autonomous Power Regulation (APR) method in order to compensate the received signal under Weak Signal (WS) condition. The approach is specifically applied for the Physical Uplink Control Channel Format 2 (PUCCH F2) in the Fifth Generation Mobile Network (5G MN).

BACKGROUND OF THE INVENTION

In mobile network, User Equipment (UE) wirelessly communicates with Base Station (BS) by means of electromagnetic signal. Weak Signal (WS) condition is determined when the Reference Signal Received Power (RSRP) is lower than −115 decibel milliwatts (dBm). Causes of WS are:

Large distance between UE and BS;

Severe weather;

Plenty of obstructions between UE and BS;

Large number of connected UEs.

At BS, the PUCCH F2 decodes the Acknowledgement/Negative-Acknowledgement (ACK/NACK) bit sent by UE. In practice, WS might lead to undesired sequences such as the wrong decoding result and the Discontinuous Transmission (DTX). While ACK/NACK is respectively decoded as NACK/ACK in the wrong decoding result scenario, the DTX means that BS could not detect the PUCCH signal transmitted by UE. Since NACK relates to data retransmission, the wrong decoded NACK means the wasted system bandwidth together with the high computational burden. On the other hand, the incorrect ACK reception at BS results in the outage of UE services due to the lack of data retransmission.

With the aid of the APR, the invention significantly reduces probabilities of both the wrong decoding result and the DTX. The autonomy is considered in the following aspects:

Signal power between reception antennas (RXs);

Signal power between symbols;

Signal power between Demodulation Reference Signal (RS) and Data (DT) Subcarriers (SCs).

Experimental results are carried out to prove the feasibility of the invention in compensating PUCCH F2 decoding results in case of:

Degraded signal power under WS condition;

Unbalanced signal power among RXs;

Not identical signal power between RS and DT SCs;

SUMMARY OF THE INVENTION

The invention effectively enhances quality of service of the 5G MN by reinforcing the received signal under WS condition. To achieve good signal, the following steps are considered:

Step 1: Sequence Generation (SG) and Reference Calculation (RC): the transmitted RS sequence is generated by known parameters so that its reference magnitude is also calculated; the obtained reference relates to the upper and lower thresholds within which power of the received signal is maintained;

Step 2: signal extraction and magnitude calculation: the autonomy of the APR is guaranteed since the received signal is extracted and classified into various RXs indexes, symbols indexes, and SCs types (RS or DT); the corresponding magnitudes are consequently achieved;

Step 3: Threshold Generation (TG), Gain Calculation (GC), and Power Regulation (PR): power regulation is adopted to ensure that magnitude of the received signal is kept within the thresholds THR whose upper and lower values are given from the reference magnitude; meanwhile, gain calculation indicates the scaling factor for controlling the received signal magnitude;

Step 4: Channel Estimation (CE), Channel Equalization (EQ), Channel Decoder (CD), and statistics: the mitigated signal by the APR is eventually utilized for estimating channel state and decoding payload; the decoded bits are statistically analyzed to validate the compensation effectiveness of the strategy in the invention.

DETAILED DESCRIPTION OF ILLUSTRATED EMBODIMENTS

Figure 1:
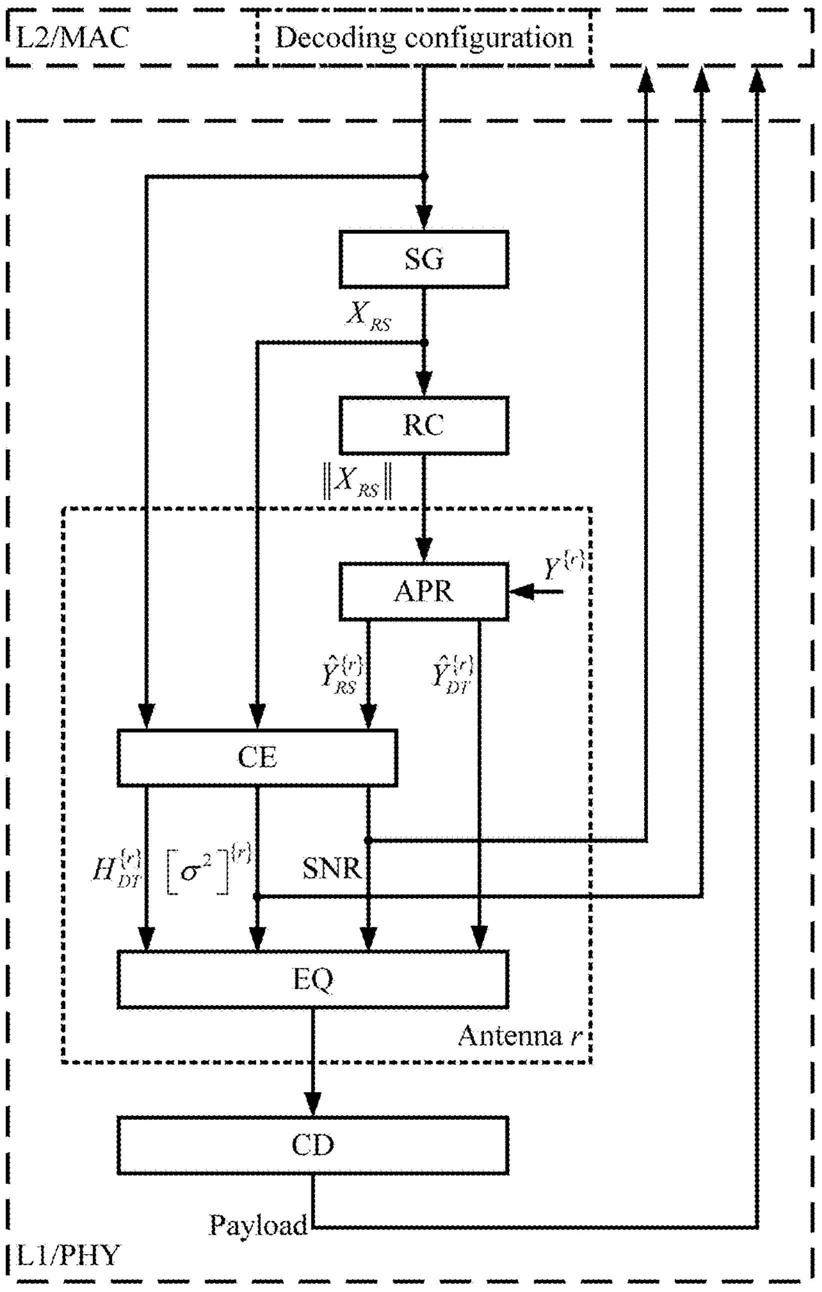
FIG. 1 is the general PUCCH F2 signal processing scheme.

Based on theories of linear algebra in Digital Signal Processing (DSP), the invention covers different received signal issues. Thanks to the robustness of the APR, the received signal is well regulated within the desired range, regardless of the WS condition. In Physical Layer (L1/PHY), the PUCCH F2 plays vital role because it decodes the received signal $Y^{\{r\}}$ into payload by means of decoding configuration. As described in FIG. 1 1, $Y^{\{r\}}$ is the frequency domain baseband signal on the antenna r while decoding configuration comes from the Media Access Control Layer (L2/MAC). Decoding configuration is a set of system and slot configurations and is required for generating the transmitted RS sequence $X_{RS}$. $X_{RS}$ is used in both channel estimation and calculation of the magnitude of $X_{RS}$, i.e. the $\|X_{RS}\|$. By comparing with the THR generated by $\|X_{RS}\|$, $$\hat{Y}_{RS}^{\{r\}}\hat{Y}_{DT}^{\{r\}}$$

are respectively the compensated forms of $Y^{\{r\}}$ at RS and DT SCs on the antenna r. Instead of the severely degraded signal $Y^{\{r\}}$ under WS condition, $$\hat{Y}_{RS}^{\{r\}}\hat{Y}_{DT}^{\{r\}}$$

are fed to the CE and the EQ for better results. In terms of RXs, symbols, and SCs (RS or DT), the APR independently processes $Y^{\{r\}}$ as $$\hat{Y}_{RS}^{\{r\}}\hat{Y}_{DT}^{\{r\}}$$

as shown in FIG. 1 1. As a result, Y is constantly maintained even though its power is degraded, unbalanced among RXs, or not identical between RS and DT SCs. In order to verify performance of the APR, the CD returns the payload from the EQ output.

The invention is expressed as the following steps:

Step 1: sequence generation and reference calculation;

Step 1.1: sequence generation:

At RS SCs, the transmitted sequence $X_{RS}$ is generated with the assistance of system and slot configurations from L2. $X_{RS}$ consists of L symbols in time domain:

$$X_{RS} = U_{l=1}^{L} X_{RS}^{\{l\}} = \left[X_{RS}^{\{1\}} \quad X_{RS}^{\{2\}} \quad \ldots \; X_{RS}^{\{L\}}\right]. \tag{1}$$

Because of independency and equality, each $$X_{RS}^{\{l\}}$$

is extracted as a set of KRS SCs:

$$X_{RS}^{\{l\}} = U_{k=1}^{KRS} X_{RS}^{\{l,k\}} = \begin{bmatrix} X_{RS}^{\{l,1\}} \\ X_{RS}^{\{l,2\}} \\ \vdots \\ X_{RS}^{\{l,KRS\}} \end{bmatrix} = \begin{bmatrix} \mathrm{Re}\left[X_{RS}^{\{l,1\}}\right] + j\mathrm{Im}\left[X_{RS}^{\{l,1\}}\right] \\ \mathrm{Re}\left[X_{RS}^{\{l,2\}}\right] + j\mathrm{Im}\left[X_{RS}^{\{l,2\}}\right] \\ \vdots \\ \mathrm{Re}\left[X_{RS}^{\{l,KRS\}}\right] + j\mathrm{Im}\left[X_{RS}^{\{l,KRS\}}\right] \end{bmatrix}. \tag{2}$$

In (2), Re and Im are respectively real and image parts of a SC while j is the imaginary number.

Step 1.2: reference calculation:

At the symbol l, (3) derives the transmitted RS sequence reference magnitude $$\left\|X_{RS}^{\{l\}}\right\|:$$

$$\left\|X_{RS}^{\{l\}}\right\| = \frac{\sum_{k=1}^{KRS}\left|\mathrm{Re}\left[X_{RS}^{\{l,k\}}\right]\right| + \sum_{k=1}^{KRS}\left|\mathrm{Im}\left[X_{RS}^{\{l,k\}}\right]\right|}{2KRS}. \tag{3}$$

Figure 2:
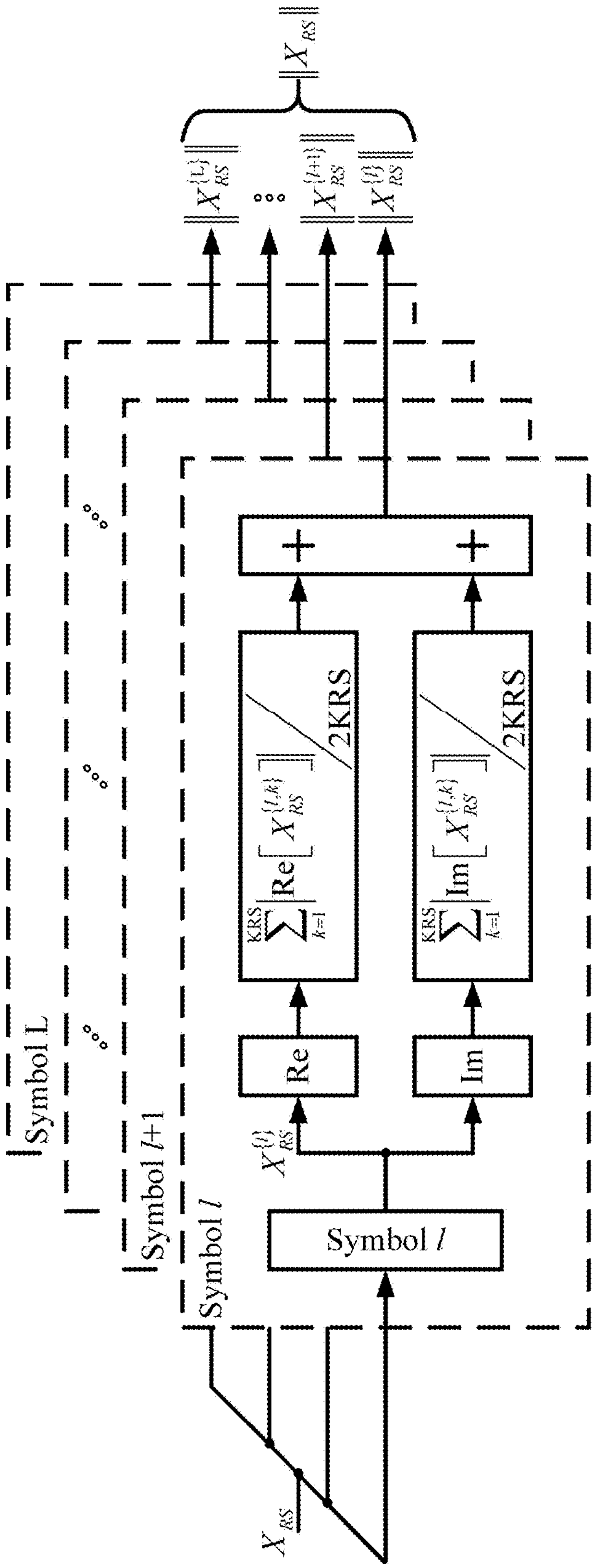
FIG. 2 is the transmitted RS RC.

It can be realized that $$\left\|X_{RS}^{\{l\}}\right\|$$

is composed of real and image parts of all KRS SCs in frequency domain. In time domain with L symbols, all $$\left\|x_{RS}^{\{l\}}\right\|$$

in FIG. 2 construct the transmitted RS sequence general reference magnitude $\|X_{RS}\|$:

$$\|X_{RS}\| = U_{l=1}^{L}\left\|X_{RS}^{\{l\}}\right\| = \left[\left\|X_{RS}^{\{1\}}\right\| \; \left\|X_{RS}^{\{2\}}\right\| \; \ldots \; \left\|X_{RS}^{\{L\}}\right\|\right]. \tag{4}$$

Step 2: signal extraction and magnitude calculation;

As inputs of the APR in FIG. 1 1, the received signal Y is independently decompressed into various components in frequency, time, and space domains.

Step 2.1: signal extraction:

Theoretically, the received signal Y is frequency domain baseband signal converted by the Remote Radio Unit (RRU). Y is a set of all received signal in space domain where R antennas are implemented:

$$Y = U_{r=1}^{R} Y^{\{r\}} = \left[Y^{\{1\}} \quad Y^{\{2\}} \; \ldots \; Y^{\{R\}}\right]. \tag{5}$$

Since all RXs are independent and alike, it is possible to separately process signal $Y^{\{r\}}$ on each antenna r:

$$Y^{\{r\}} = U_{l=1}^{L} Y^{\{r,l\}} = \left[Y^{\{r,1\}} \quad Y^{\{r,2\}} \; \ldots \; Y^{\{r,L\}}\right]. \tag{6}$$

In (6), $Y^{\{r\}}$ is written as a form of all received signal on all L symbols. Similar to space domain, time domain is also divided into L loops for separate calculation in DSP. Hence, each $Y^{\{r,l\}}$ is considered as a combination of all K SCs:

$$Y^{\{r,l\}} = U_{k=1}^{K} Y^{\{r,l,k\}} = \begin{bmatrix} Y^{\{r,l,1\}} \\ Y^{\{r,l,2\}} \\ \vdots \\ Y^{\{r,l,K\}} \end{bmatrix}. \tag{7}$$

Figure 3:
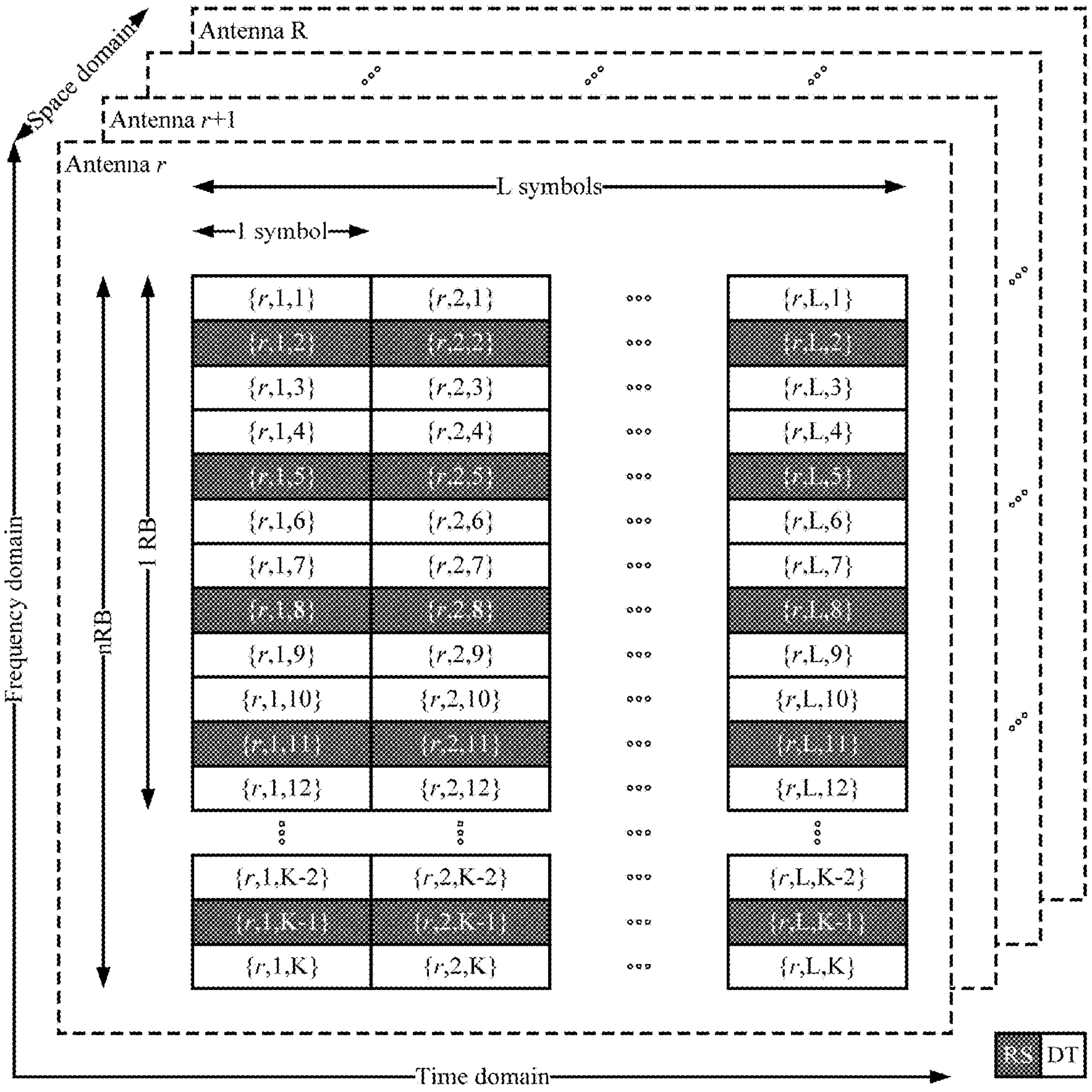
FIG. 3 is the distribution of PUCCH F2 on resource grid.
Figure 4:
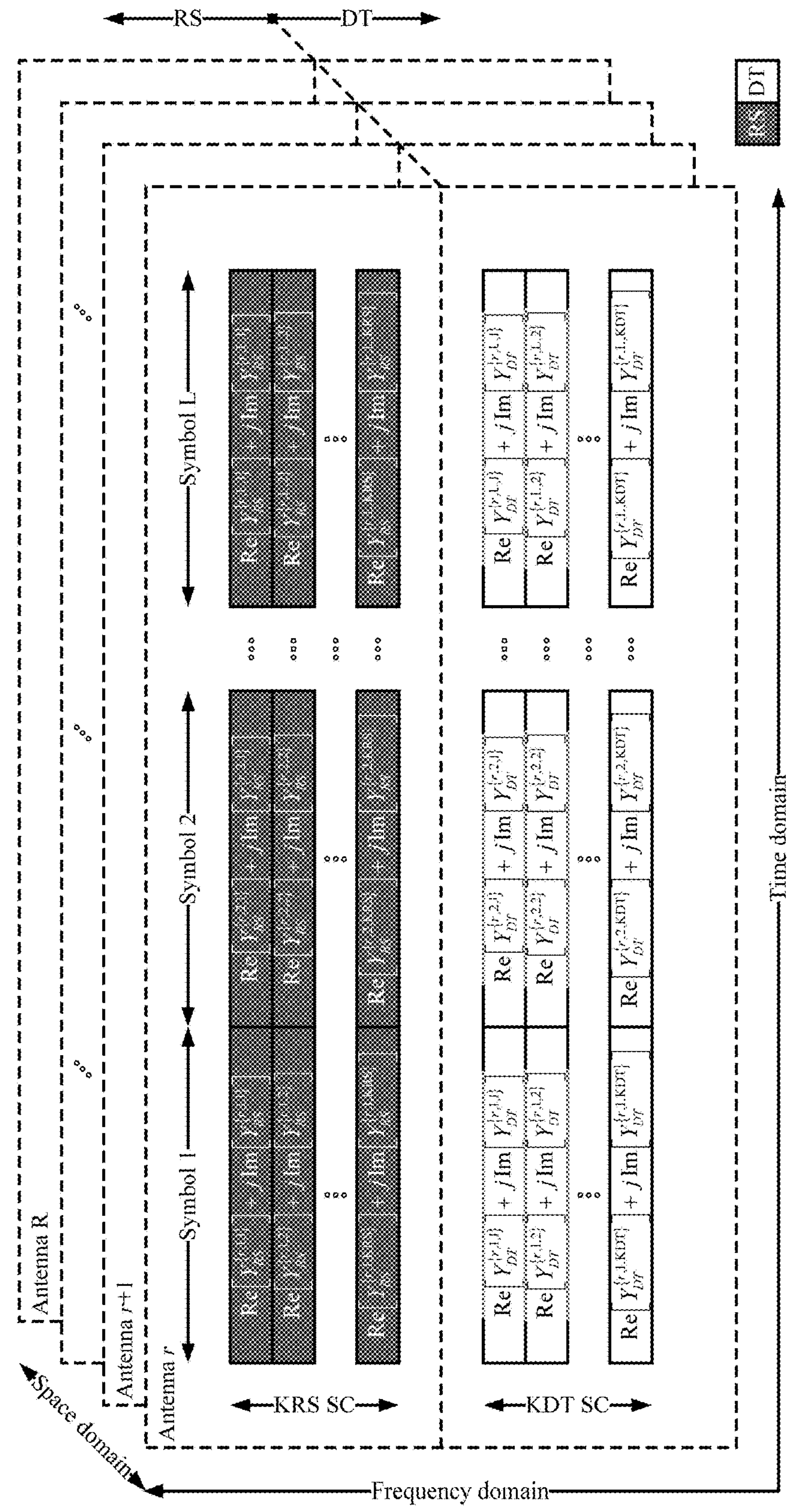
FIG. 4 is the classified signal types.

RS and DT are two types of SC in the 5G PUCCH F2, and they are distributed on resource grid as depicted in FIG. 3. When considering roles of RS and DT SCs in frequency domain, they are discrete complex numbers. Therefore, these two SC types are separately divided into two groups as illustrated in FIG. 4:

$$Y^{\{r,l\}} = Y_{RS}^{\{r,l\}} \cup Y_{DT}^{\{r,l\}}. \tag{8}$$

In (8), $$Y_{RS}^{\{r,l\}} \text{ and } Y_{DT}^{\{r,l\}}$$

are respectively the received RS and DT signals on the antenna r, at the symbol l. (9) and (10) provide detail expression of $$Y_{RS}^{\{r,l\}} \text{ and } Y_{DT}^{\{r,l\}}$$

as matrix of complex numbers:

$$Y_{RS}^{\{r,l\}} = U_{k=1}^{KRS} Y_{RS}^{\{r,l,k\}} = \begin{bmatrix} Y_{RS}^{\{r,l,1\}} \\ Y_{RS}^{\{r,l,2\}} \\ \vdots \\ Y_{RS}^{\{r,l,KRS\}} \end{bmatrix} = \begin{bmatrix} \mathrm{Re}\left[Y_{RS}^{\{r,l,1\}}\right] + j\mathrm{Im}\left[Y_{RS}^{\{r,l,1\}}\right] \\ \mathrm{Re}\left[Y_{RS}^{\{r,l,2\}}\right] + j\mathrm{Im}\left[Y_{RS}^{\{r,l,2\}}\right] \\ \vdots \\ \mathrm{Re}\left[Y_{RS}^{\{r,l,KRS\}}\right] + j\mathrm{Im}\left[Y_{RS}^{\{r,l,KRS\}}\right] \end{bmatrix}, \tag{9}$$

-continued $$Y_{DT}^{\{r,l\}}=U_{k=1}^{KDT}Y_{DT}^{\{r,l,k\}}=\begin{bmatrix}Y_{DT}^{\{r,l,1\}}\\Y_{DT}^{\{r,l,2\}}\\\vdots\\Y_{DT}^{\{r,l,KDT\}}\end{bmatrix}=\begin{bmatrix}\mathrm{Re}[Y_{DT}^{\{r,l,1\}}]+j\mathrm{Im}[Y_{DT}^{\{r,l,1\}}]\\\mathrm{Re}[Y_{DT}^{\{r,l,2\}}]+j\mathrm{Im}[Y_{DT}^{\{r,l,2\}}]\\\vdots\\\mathrm{Re}[Y_{DT}^{\{r,l,KDT\}}]+j\mathrm{Im}[Y_{DT}^{\{r,l,KDT\}}]\end{bmatrix},\tag{10}$$

where KRS and KDT are respectively the total number of RS and DT SCs and are calculated from the total resource block number nRB which is a known parameter:

$$KRS=4nRB,\tag{11}$$

$$KDT=8nRB.\tag{12}$$

From (9) and (10), it can be seen that the received signal Y is analyzed as different components in:

space domain with multiple RXs, time domain with multiple symbols, and frequency domain with multiple SC types (RS or DT).

Step 2.2: magnitude calculation:

On the antenna r and at the symbol l, $$\|Y_{RS}^{\{r,l\}}\|\text{ and }\|Y_{DT}^{\{r,l\}}\|$$

are respectively magnitude of the received RS and DT signals, and they are obtained by averaging absolute value of real and image parts on all corresponding SCs:

$$\|Y_{RS}^{\{r,l\}}\|=\frac{\sum_{k=1}^{KRS}|\mathrm{Re}[Y_{RS}^{\{r,l,k\}}]|+\sum_{k=1}^{KRS}|\mathrm{Im}[Y_{RS}^{\{r,l,k\}}]|}{2KRS},\tag{13}$$

$$\|Y_{DT}^{\{r,l\}}\|=\frac{\sum_{k=1}^{KDT}|\mathrm{Re}[Y_{DT}^{\{r,l,k\}}]|+\sum_{k=1}^{KDT}|\mathrm{Im}[Y_{DT}^{\{r,l,k\}}]|}{2KDT}.\tag{14}$$

Step 3: threshold generation, gain calculation, and power regulation;

The APR shown in FIG. 1 comprises three functions: the TG, the GC, and the PR. From the reference $$\|x_{RS}^{\{l\}}\|$$

in (3), the TG calculates the reference THR which has upper and lower limits. With the aid of the gain generated by the GC, the PR effectively keep the magnitudes in (13) and (14) within limits as demonstrated in FIG. 5. The detail process is expressed as follows:

Step 3.1: threshold generation;

In (3), $$\|x_{RS}^{\{l\}}\|$$

is the desired magnitude of the received signal. However, it is still sufficiently good for practical DSP when magnitude of the received signal is within a range of values called THR. Thus, THR is defined as the following formula:

$$THR\triangleq[Thr_1;\,Thr_2],\tag{15}$$

where $Thr_1$ and $Thr_2$ are respectively the lower and upper thresholds, and they are derived as below:

$$Thr_1=\frac{\|X_{RS}^{\{l\}}\|}{2^{n1}},\tag{16}$$

$$Thr_2=2^{n2}\|X_{RS}^{\{l\}}\|.\tag{17}$$

In (16) and (17), n1 and n2 are parameters obtained by experiment. Therefore, THR is rewritten as a form of $$\|x_{RS}^{\{l\}}\|,$$

n1, and n2:

$$THR\triangleq\left[\frac{\|X_{RS}^{\{l\}}\|}{2^{n1}};\,2^{n2}\|X_{RS}^{\{l\}}\|\right].\tag{18}$$

Because of over floating in calculation, an over 13 bit signal magnitude is not recommended in 16-bit DSP. THR is consequently saturated in (19):

$$THR\triangleq\left[\frac{\|X_{RS}^{\{l\}}\|}{2^{n1}};\,2^{n2}\|X_{RS}^{\{l\}}\|\right]\cap[2^1;\,2^{13}]\triangleq[THR_1;\,THR_2].\tag{19}$$

Step 3.2: gain calculation:

Gain is an integer used for multiplying or dividing the received signal magnitudes $$\|Y_{RS}^{\{r,l\}}\|$$

in (13) and $$\|Y_{DT}^{\{r,l\}}\|$$

in (14) to meet the required THR.

When $$\|Y_{RS}^{\{r,l\}}\|\text{ or }\|Y_{DT}^{\{r,l\}}\|$$

is greater than $THR_2$, it is mandatory to reduce magnitude of the received signal by one binary bit, equivalently, half division in decimal. The updated value of $$\|Y_{RS}^{\{r,l\}}\|\text{ or }\|Y_{DT}^{\{r,l\}}\|,$$

generally the $$\left\|Y_{RS/DT}^{(r,l)}\right\|,$$

becomes:

$$\left\|Y_{RS/DT}^{(r,l)}\right\| = \frac{\left\|Y_{RS/DT}^{(r,l)}\right\|}{2}. \tag{20}$$

As a result, the binary bit number, i.e. the gain $nBit_{RS/DT}$, is decreasingly adjusted an amount of one in order to achieve the new received signal magnitude in (20):

$$nBit_{RS/DT} = nBit_{RS/DT} - 1. \tag{21}$$

While $$\left\|Y_{RS/DT}^{(r,l)}\right\|$$

in (20) is greater than $THR_2$ in (19), (20) and (21) are repeatedly processed to scale down the received signal magnitude. Once $$\left\|Y_{RS/DT}^{(r,l)}\right\|$$

is less than $THR_2$, the final gain $nBit_{RS/DT}$ is obtained after n times of reduction. In other words, the gain $nBit_{RS/DT}$ is the binary bit number needed for $$Y_{RS/DT}^{(r,l)}$$

division to ensure that $$\left\|Y_{RS/DT}^{(r,l)}\right\|$$

is less than $THR_2$. (22) gives the $nBit_{RS/DT}$ value:

$$nBit_{RS/DT} = -n. \tag{22}$$

In contrast, $$\left\|Y_{RS/DT}^{(r,l)}\right\|$$

is multiplied with an over unity gain when $$\left\|Y_{RS/DT}^{(r,l)}\right\|$$

in (13) and (14) is less than $THR_1$ in (19). In DSP theory, the one left shifted bit operation in binary equivalents to the by two multiplication in decimal. Specifically, it is the following relationship:

$$\left\|Y_{RS/DT}^{(r,l)}\right\| = 2\left\|Y_{RS/DT}^{(r,l)}\right\|, \tag{23}$$

$$nBit_{RS/DT} = nBit_{RS/DT} + 1. \tag{24}$$

To reach the increment of the received signal magnitude in (23), it is mandatory to add an unit to the gain $nBit_{RS/DT}$. While the updated $$\left\|Y_{RS/DT}^{(r,l)}\right\|$$

in (23) is less than $THR_1$ in (19), (23) and (24) are repeatedly executed n times until $$\left\|Y_{RS/DT}^{(r,l)}\right\|$$

is greater than $THR_1$. After that, (25) provides the calculated gain $nBit_{RS/DT}$ which is used to scale up the received signal $$Y_{RS/DT}^{(r,l)}$$

to achieve the desired $$\left\|Y_{RS/DT}^{(r,l)}\right\|$$

value.

$$nBit_{RS/DT} = n. \tag{25}$$

Figure 6:
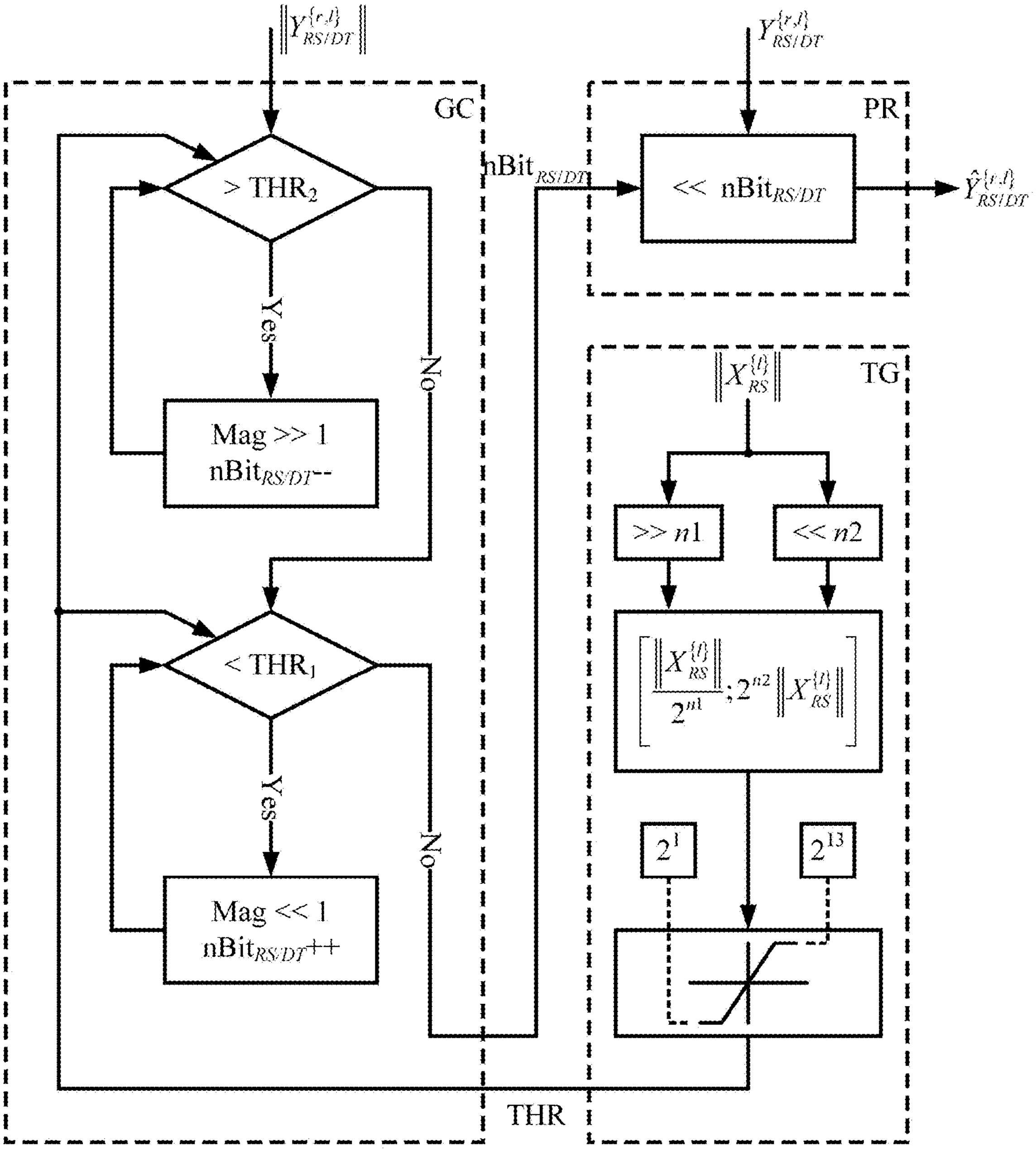
FIG. 6 is the TG, the GC, and the PR.

Step 3.3: power regulation:

In FIG. 6, $$\hat{Y}_{RS/DT}^{(r,l)}$$

is the compensated signal of $$Y_{RS/DT}^{(r,l)}$$

with the aid of the $nBit_{RS/DT}$. While $$Y_{RS/DT}^{(r,l)}$$

are respectively in (9) and (10), $nBit_{RS/DT}$ is in either (22) or (25):

$$\hat{Y}_{RS/DT}^{(r,l)} = 2^{nBit_{RS/DT}} Y_{RS/DT}^{(r,l)}. \tag{26}$$

In (26), it can be seen that the received signal is scaled down to be less than $THR_2$ in case of the negative gain, and vice versa with the positive $nBit_{RS/DT}$. Thanks to the APR, the received signal is independently controlled in terms of RX index r, symbol index l, and SC type (RS or DT).

After power regulation, (27) derives the joint received signal $$\hat{Y}_{RS}^{\{r\}} \text{ of all } \hat{Y}_{RS}^{\{r,l\}}$$

on all L symbols, on the antenna r, and at RS SCs. Due to the autonomy in processing each symbol, $$\hat{Y}_{RS}^{\{r\}}$$

is a discrete matrix with L columns.

$$\hat{Y}_{RS}^{\{r\}} = \bigcup_{l=1}^{L} \hat{Y}_{RS}^{\{r,l\}} = [\hat{Y}_{RS}^{\{r,1\}} \ \hat{Y}_{RS}^{\{r,2\}} \ \dots \ \hat{Y}_{RS}^{\{r,L\}}]. \tag{27}$$

Instead of the seriously degraded $Y^{\{r\}}$ in (6) under WS condition, the CE exploits all advantages offered by $$\hat{Y}_{RS}^{\{r\}}$$

to lead to better channel estimation outputs including the channel state matrix $$H_{DT}^{\{r\}},$$

the noise power $[\sigma^2]^{\{r\}}$, the Signal-to-Noise Ratio (SNR), etc.

Besides the CE, the EQ in FIG. 1 also inputs Y at DT SCs to recover the transmitted information symbols. Hence, high quality input signal is very important to guarantee robustness of the PUCCH F2. Similar to $$\hat{Y}_{RS}^{\{r\}},$$

the APR in FIG. 1 mitigates Y on all L symbols, on the antenna r, and at DT SCs as $$\hat{Y}_{DT}^{\{r\}}.$$

Figure 5:
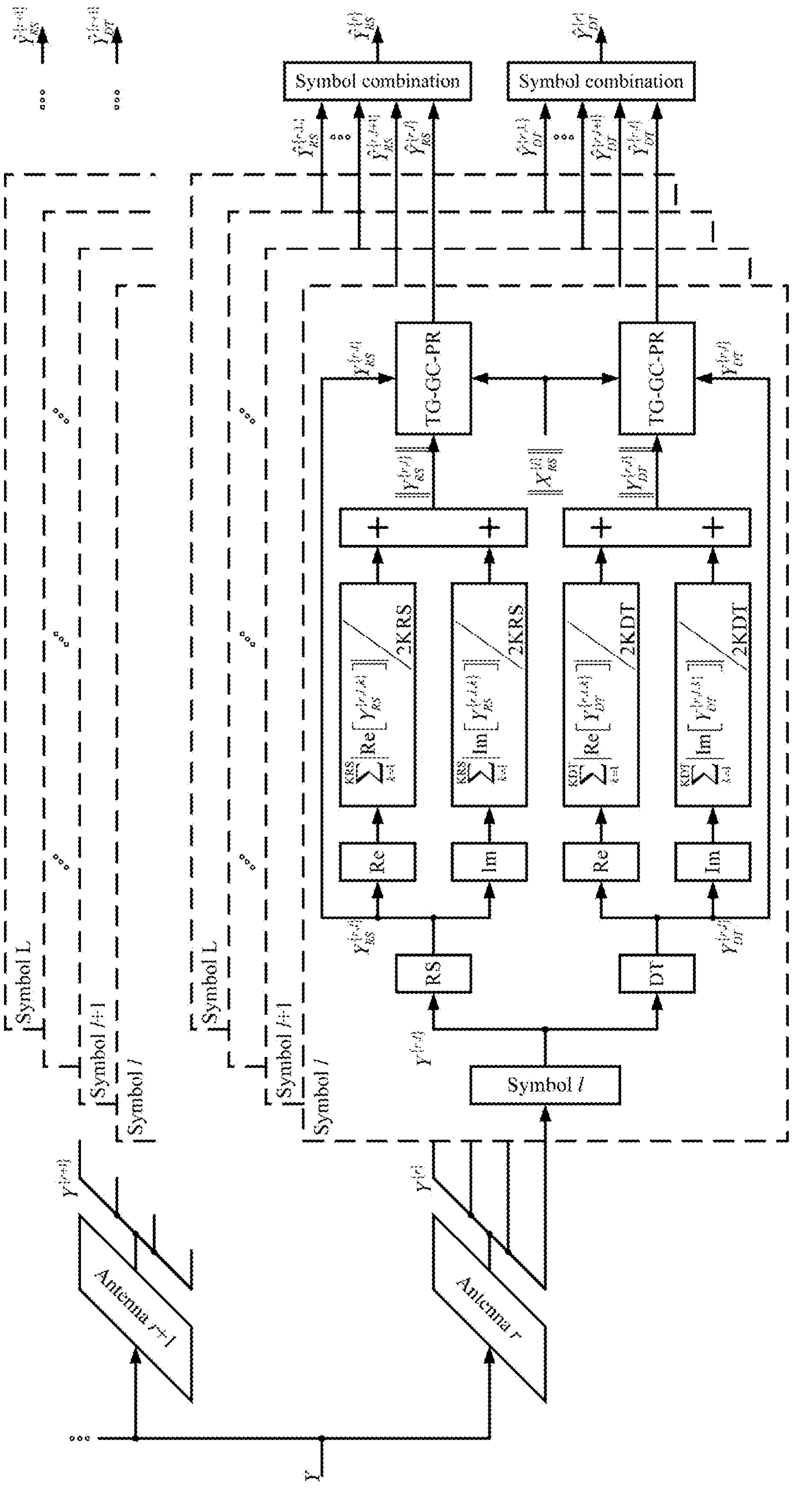
FIG. 5 is the detailed block diagram of the APR.

With L symbols in FIG. 5, $$\hat{Y}_{DT}^{\{r\}}$$

is declared as a set of $$\hat{Y}_{DT}^{\{r,l\}}$$

as in (28):

$$\hat{Y}_{DT}^{\{r\}} = \bigcup_{l=1}^{L} \hat{Y}_{DT}^{\{r,l\}} = [\hat{Y}_{DT}^{\{r,1\}} \ \hat{Y}_{DT}^{\{r,2\}} \ \dots \ \hat{Y}_{DT}^{\{r,L\}}]. \tag{28}$$

Step 4: channel estimation, channel equalization, channel decoder, and statistics;

By means of decoding configuration from L2, L1 applies the APR for the received signal before implementing the CE, the EQ, and the CD as in FIG. 1. Based on the enhanced signal, PUCCH F2 returns to L2 demanded information such as the $[\sigma^2]^{\{r\}}$, the SNR, payload, etc.

The CE determines state matrixes at RS and DT SCs which are respectively $$H_{RS}^{\{r\}} \text{ and } H_{DT}^{\{r\}}.$$

While the $[\sigma^2]^{\{r\}}$ and the SNR are estimated by $$H_{RS}^{\{r\}} \text{ and } \hat{Y}_{RS}^{\{r\}}$$

in the CE, the EQ utilizes $$H_{DT}^{\{r\}}, [\sigma^2]^{\{r\}}, \text{ and } \hat{Y}_{DT}^{\{r\}}$$

for elimination of noise effect, antenna combination, and information symbols regeneration. From the CE and the EQ view point, it can be concluded that APR offers significant advancements because high quality $$\hat{Y}_{RS}^{\{r\}} \text{ and } \hat{Y}_{DT}^{\{r\}}$$

also means high accuracy in PUCCH F2 operation.

Payload is an output of the CD which is composed of demodulation, descrambling, and bit decoder. Payload is also recorded at L1 in order to evaluate PUCCH F2 performance with two probabilities: the ACK Missed Detection Probability (PACK) and the ACK to NACK Probability (PA2N). When an ACK was sent, PA2N is the probability that a NACK is falsely detected while PACK is the probability of not detecting an ACK.

EXAMPLE OF THE INVENTION

Figure 7:
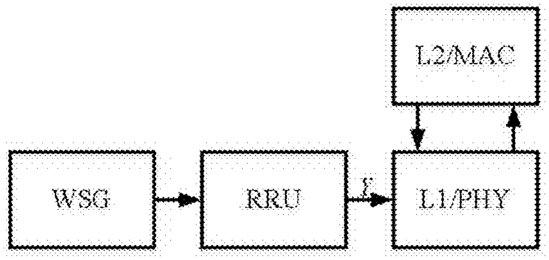
FIG. 7 is the experimental setup.

In the invention, validation of the APR performance is brought out with experimental results. FIG. 7 depicts experimental prototype which consists of four main blocks: the Waveform Signal Generator (WSG), RRU, L1, and L2. The WSG allows different Radio Frequency (RF) signal scenarios in time domain with specific channel condition, noise, interference, and transmitted power. The considered test cases are the WS condition, the unbalanced power among RXs, and the not identical power between RS and DT SCs. Simultaneously, RRU converts the RF time domain signal into baseband frequency domain signal $Y^{\{r\}}$ on each antenna r. The PUCCH F2 at L1 consequently decodes the improved signal by the APR with known decoding configuration which are system and slot configurations. As described in Table 1, system configurations include different parameters such as system bandwidth, subcarrier spacing, number of transmission antenna, and number of reception antenna. Meanwhile, Table 2 lists the PUCCH F2 slot configurations as specified in 8.3.4.1.1 in the TS 38.104 V16.6.0 by the $3^{rd}$ Generation Partnership Project (3GPP).

TABLE 1

| system configurations | |
|---|---|
| Parameter | Value |
| Bandwidth | 100 MHz |
| Subcarrier spacing | 30 kHz |
| Number of transmission antenna nTX | 1 |
| Number of reception antenna nRX | 2, 4, 8 |

TABLE 2

| slot configurations | |
|---|---|
| Parameter | Value |
| Modulation type | QPSK |
| Start resource block | 0 |
| Frequency hopping | Not available |
| Second hop resource block | 0 |
| Resource block number | 4 |
| Symbol number | 1 |
| Payload length | 4 |
| Start symbol | 13 |
| RS sequence generation $N_{ID}^{0}$ | 0 |

In 32-bit system, a SC is a complex number with a real and an image parts which are both 16-bit numbers. Nevertheless, it is quiet understandable to limit signal magnitude at 10-bit number for preventing over floating in manipulation. Furthermore, a 10-bit number is also considered as a base unit to provide convenience in viewing magnitude of the received signal in per-unit (pu).

As mentioned earlier, n1 and n2 in (19) are determined by experiment and they are respectively 1 and 0 in the invention. In other words, APR does not affect the received signal when its magnitude is within half of a pu and a pu. Otherwise, the undesired signal magnitude is regulated back to the reference threshold range.

To obtain validation of the APR performance, different test cases are under consideration as given in Table 3 and Table 4. Correspondingly, PACK and PA2N are observed as PUCCH F2 decoding quality when the APR is introduced in the system or not. Table 3 shows magnitudes of the Received Signal Power Level (RL) in pu on each RX and RL values are explicitly expressed as below:

- RL 1 means that the received signals have degraded magnitude, balanced power among RXs, and identical power between RS and DT SCs.
- RL 2 means that the received signals have degraded magnitude, unbalanced power among RXs, and identical power between RS and DT SCs.
- RL 3 means that the received signals have degraded magnitude, unbalanced power among RXs, and not identical power between RS and DT SCs.
- RL 4 means that the received signals have over magnitude, balanced power among RXs, and identical power between RS and DT SCs.
- RL 5 means that the received signals have over magnitude, unbalanced power among RXs, and identical power between RS and DT SCs.
- RL 6 means that the received signals have over magnitude, unbalanced power among RXs, and not identical power between RS and DT SCs.

Besides signal power with RLs, the experimental setup also relates to interference and channel conditions which stand by Propagation Condition (PC) values in Table 4. While the "TDLC300-100 Low" is common in all PCs, SNR in decibel (dB) varies according to nRX as proposed by the 3GPP TS 38.104 V16.6.0 in 8.3.4.1.2.

TABLE 3

| magnitudes of the received signal power level | | | | |
|---|---|---|---|---|
| | | From left to right and fro top to bottom, magnitude of the received signal (pu) | | |
| RL | nRX | RS | DT | Notes |
| 1 | 2 | $\begin{bmatrix}\frac{1}{16} & \frac{1}{16}\end{bmatrix}$ | $\begin{bmatrix}\frac{1}{16} & \frac{1}{16}\end{bmatrix}$ | Weak signal, balanced antennas power, identical RS and DT SCs power |
| | 4 | $\begin{bmatrix}\frac{1}{16} & \frac{1}{16} & \frac{1}{16} & \frac{1}{16}\end{bmatrix}$ | $\begin{bmatrix}\frac{1}{16} & \frac{1}{16} & \frac{1}{16} & \frac{1}{16}\end{bmatrix}$ | |
| | 8 | $\begin{bmatrix}\frac{1}{16} & \frac{1}{16} & \frac{1}{16} & \frac{1}{16} & \frac{1}{16} & \frac{1}{16} & \frac{1}{16} & \frac{1}{16}\end{bmatrix}$ | $\begin{bmatrix}\frac{1}{16} & \frac{1}{16} & \frac{1}{16} & \frac{1}{16} & \frac{1}{16} & \frac{1}{16} & \frac{1}{16} & \frac{1}{16}\end{bmatrix}$ | |
| 2 | 2 | $\begin{bmatrix}\frac{1}{16} & \frac{1}{8}\end{bmatrix}$ | $\begin{bmatrix}\frac{1}{16} & \frac{1}{8}\end{bmatrix}$ | Weak signal, unbalanced antennas power, identical RS and DT SCs power |
| | 4 | $\begin{bmatrix}\frac{1}{16} & \frac{1}{8} & \frac{1}{16} & \frac{1}{8}\end{bmatrix}$ | $\begin{bmatrix}\frac{1}{16} & \frac{1}{8} & \frac{1}{16} & \frac{1}{8}\end{bmatrix}$ | |
| | 8 | $\begin{bmatrix}\frac{1}{16} & \frac{1}{8} & \frac{1}{16} & \frac{1}{8} & \frac{1}{16} & \frac{1}{8} & \frac{1}{16} & \frac{1}{8}\end{bmatrix}$ | $\begin{bmatrix}\frac{1}{16} & \frac{1}{8} & \frac{1}{16} & \frac{1}{8} & \frac{1}{16} & \frac{1}{8} & \frac{1}{16} & \frac{1}{8}\end{bmatrix}$ | |
| 3 | 2 | $\begin{bmatrix}\frac{1}{8} & \frac{1}{4}\end{bmatrix}$ | $\begin{bmatrix}\frac{1}{16} & \frac{1}{8}\end{bmatrix}$ | Weak signal, unbalanced antennas power, not identical RS and DT SCs power |
| | 4 | $\begin{bmatrix}\frac{1}{8} & \frac{1}{4} & \frac{1}{8} & \frac{1}{4}\end{bmatrix}$ | $\begin{bmatrix}\frac{1}{16} & \frac{1}{8} & \frac{1}{16} & \frac{1}{8}\end{bmatrix}$ | |

TABLE 3-continued magnitudes of the received signal power level

| RL | nRX | RS (From left to right and fro top to bottom, magnitude of the received signal (pu)) | DT | Notes |
|---|---|---|---|---|
| | 8 | $\begin{bmatrix} \frac{1}{8} & \frac{1}{4} & \frac{1}{8} & \frac{1}{4} & \frac{1}{8} & \frac{1}{4} & \frac{1}{8} & \frac{1}{4} \end{bmatrix}$ | $\begin{bmatrix} \frac{1}{16} & \frac{1}{8} & \frac{1}{16} & \frac{1}{8} & \frac{1}{16} & \frac{1}{8} & \frac{1}{16} & \frac{1}{8} \end{bmatrix}$ | |
| 4 | 2 | [16 16] | [16 16] | Over signal, balanced antennas power, identical RS and DT SCs power |
| | 4 | [16 16 16 16] | [16 16 16 16] | |
| | 8 | [16 16 16 16 16 16 16 16] | [16 16 16 16 16 16 16 16] | |
| 5 | 2 | [16 8] | [16 8] | Over signal, unbalanced antennas power, identical RS and DT SCs power |
| | 4 | [16 8 16 8] | [16 8 16 8] | |
| | 8 | [16 8 16 8 16 8 16 8] | [16 8 16 8 16 8 16 8] | |
| 6 | 2 | [16 8] | [8 4] | Over signal, unbalanced antennas power, not identical RS and DT SCs power |
| | 4 | [16 8 16 8] | [8 4 8 4] | |
| | 8 | [16 8 16 8 16 8 16 8] | [8 4 8 4 8 4 8 4] | |

TABLE 4 interference and channel conditions

| PC | nTX | nRX | Cyclic prefix | Channel propagation condition | SNR (dB) |
|---|---|---|---|---|---|
| 1 | 1 | 2 | Normal | TDLC300-100 Low | 5.7 |
| 2 | 1 | 4 | Normal | TDLC300-100 Low | 0.4 |
| 3 | 1 | 8 | Normal | TDLC300-100 Low | −3.3 |

TABLE 5 experimental results with different RL and PC values

| RL | PC | nRX | With APR PACK (%) | With APR PA2N (%) | Without APR PACK (%) | Without APR PA2N (%) |
|---|---|---|---|---|---|---|
| 1 | 1 | 2 | 1.321 | 0.778 | 12.110 | 0.854 |
| | 2 | 4 | 4.444 | 0.564 | 47.353 | 0.863 |
| | 3 | 8 | 6.257 | 0.376 | 92.798 | 7.909 |
| 2 | 1 | 2 | 1.761 | 0.498 | 6.778 | 0.612 |
| | 2 | 4 | 4.198 | 0.473 | 16.863 | 0.612 |
| | 3 | 8 | 6.300 | 0.343 | 35.993 | 0.879 |
| 3 | 1 | 2 | 1.512 | 0.212 | 3.676 | 0.439 |
| | 2 | 4 | 4.179 | 0.438 | 6.975 | 0.609 |
| | 3 | 8 | 6.152 | 0.345 | 10.194 | 0.651 |
| 4 | 1 | 2 | 56.817 | 0.713 | 62.627 | 0.928 |
| | 2 | 4 | 10.498 | 0.509 | 12.991 | 0.903 |
| | 3 | 8 | 4.001 | 0.447 | 6.857 | 0.601 |
| 5 | 1 | 2 | 7.512 | 0.552 | 27.134 | 0.815 |
| | 2 | 4 | 4.625 | 0.518 | 12.899 | 0.864 |
| | 3 | 8 | 4.100 | 0.408 | 9.512 | 0.715 |
| 6 | 1 | 2 | 7.445 | 0.454 | 29.298 | 0.517 |
| | 2 | 4 | 4.102 | 0.472 | 11.869 | 0.666 |
| | 3 | 8 | 5.011 | 0.396 | 9.302 | 0.489 |

Table 5 is experimental results of the PACK and the PA2N when RL and PC are fixed. As presented in Table 5, each RL is combined with each PC in experiment to investigate compensation effectiveness of the studied power regulation method.

In case RL is equal to 1, the APR significantly enhances the PACK despite the seriously reduced signal magnitude on all RXs. With the APR, the PACK is always less than 7.000% even though the actual magnitude is sixteen times less than the reference magnitude. On the contrary, decoding results become worse with the more than 90.000% PACK in 8 RXs system when APR is not exploited.

PACK difference is about 5.000% in case of with and without the APR in 2 RXs system and the RL 2. The PACK difference is up to 30.000% when nRX increases.

In the invention, the received signal is not only asymmetrically degraded but also not identical at RS and DT SCs with the RL 3 in Table 3. When the APR independently controls RS and DT SCs power, the PACKs are respectively 1.512%, 4.179%, and 6.152% as in Table 5. Without the support from the APR, Table 5 also proves that PUCCH F2 decoder is inadequately robust to cover all issues caused by the abnormal received signal since the PACKs are respectively 3.676%, 6.975%, and 10.194% in 2 RXs, 4 RXs, and 8 RXs system.

Unlike the degradation in signal power, over signal means the undesirably increased signal power and magnitude when multiple signals arrive within the specific range of phase angle.

When RL is equal to 4, signal magnitude is sixteen times greater than a base magnitude. Without applying proper solution such as the APR, decoding result is severely poor with the 62.627% PACK in 2 RXs system as a consequence of the saturation as well as the mismatch in DSP. Thankfully, the APR steadily keeps the PACK at 56.817% which is an impressive improvement in overall performance perspective. Similarly, the APR approach is also helpful for the 4 RXs and 8 RXs results.

With the RL 5, signal magnitude is both over and unbalanced between RXs. PACKs are respectively 27.134% without the APR and 7.512% with the APR in 2 RXs system. From the reduced amount of PACK of about 19.622%, the superiority of the APR in signal quality mitigation is clearly realized. Because of the signal magnitude reduction, APR also well performs in 4 RXs and 8 RXs system.

Similar to the WS condition, over signal power also contains the scenario of not identical power at RS and DT SCs when RL is 6. As listed in Table 3, RS signal power is two times greater than DT signal power. Under such hard condition, the APR is still applicable in signal quality enhancement. Generally, PACK drops from 29.298% to 7.445% in 2 RXs system, from 11.869% to 4.102% in 4 RXs system, and from 9.302% to 5.011% in 8 RXs system. Equivalently, the gained PACKs are respectively 21.853%, 7.767%, and 4.291%.

Besides the PACK, PA2N is also an important factor to evaluate compensation effectiveness of the APR. With constant SNRs in Table 4, PA2N is slightly reduced when the APR is operated in system. Theoretically, a falsely decoded payload causes serious affect to system bandwidth as well as stability. If a NACK is decoded as ACK, it is hard to continuously ensure the UE service because UE does not receive appropriate data packets via data retransmission. On the other hand, if an ACK is decoded as NACK, data retransmission is unnecessarily proceeded which means the wasted bandwidth and resources. Thus, the APR with lower PA2Ns is feasible in practical applications.

With the statistics in Table 5, it is clear to realize that the RL 1 reflects the most different in decoding efficiency between with and without the APR scenarios. Therefore, the RL 1 is additionally investigated within a range of SNRs instead of the fixed SNRs in PC 1, PC 2, or PC 3 in Table 4. In other words, it is needed to demonstrate that the APR versatilely compensate quality of the received signal in not only fixed scheme but also widely variable condition.

TABLE 6 experimental results with the RL 1 and range of SNRs

| SNR | | With APR | | Without APR | |
|---|---|---|---|---|---|
| (dB) | nRX | PACK (%) | PA2N (%) | PACK (%) | PA2N (%) |
| −10.0 | 2 | 94.512 | 6.781 | 99.903 | 62.826 |
| | 4 | 92.990 | 5.764 | 99.673 | 60.440 |
| | 8 | 84.874 | 2.118 | 98.004 | 56.672 |
| −5.0 | 2 | 67.331 | 0.465 | 91.746 | 54.679 |
| | 4 | 53.376 | 0.990 | 95.092 | 39.352 |
| | 8 | 18.553 | 0.899 | 97.937 | 6.000 |
| 0.0 | 2 | 21.735 | 0.553 | 67.719 | 6.987 |
| | 4 | 6.656 | 0.986 | 47.315 | 0.296 |
| | 8 | 1.776 | 0.323 | 42.616 | 0.328 |
| 5.0 | 2 | 2.001 | 0.121 | 16.052 | 0.491 |
| | 4 | 1.176 | 0.459 | 6.035 | 0.712 |
| | 8 | 1.012 | 0.644 | 1.287 | 0.907 |
| 10.0 | 2 | 1.312 | 0.439 | 1.537 | 0.873 |
| | 4 | 0.053 | 0.200 | 1.918 | 0.286 |
| | 8 | 0.727 | 0.178 | 1.439 | 0.133 |

Table 6 presents experimental results of PACK and PA2N with different nRX values under the RL 1, the "TDLC300-100 Low" channel type, and the variable SNRs condition.

In Table 6, when SNR is set as −10.0 dB, the APR is especially helpful in 8 RXs system because the PACK is lessened from 98.004% to 84.874%. In 2 RXs and 4 RXs system, the PACKs are respectively 99.903% and 99.673% without the APR. And with the APR, the corresponding PACKs are 94.512% and 92.990% which is a slight improvement in the PACK. In terms of the PA2N, it is an excellent advancement because PA2Ns are reduced from 62.826%, 60.440%, and 56.672% to 6.781%, 5.764%, and 2.118% in 2 RXs, 4 RXs, and 8 RXs system, respectively.

At the −5.0 dB SNR, the PACKs are always greater than 90.000% due to the absence of the APR. However, they are noticeably low with the values of 67.331%, 53.376%, and 18.553% in 2 RXs, 4 RXs, and 8 RXs system when the APR is executed. While higher nRX is lower the PACKs, lower nRX has better PA2N results as given in Table 6. In Table 6, the PA2Ns are reduced from 54.679%, 39.352%, and 6.000% to 0.465%, 0.990%, and 0.899% in 2 RXs, 4 RXs, and 8 RXs system, respectively.

When noise power is equal to signal power with the 0.0 dB SNR, the APR is still effective with the approximate 40.000% reduction in the PACKs.

With the 5.0 dB SNR, the APR operation is only recognized in 2 RXs and 4 RXs system where the PACKs decrease from 16.052% and 6.035% to 2.001% and 1.176%. In 8 RXs system, quality of the received signal is sufficiently high with the 1.287% PACK in regular control strategy, it is not vital to activate the APR under such condition.

According to the predetermined upper and lower thresholds, the APR is automatically turned off when the received signal magnitude is originally acceptable as at the 10.0 dB SNR as in Table 6. Without the APR, the PACKs are already lower than 2.000% and it is consequently hard to differentiate with the PACKs under the APR support. This results are quite explainable because signal power is much greater than noise power in good channel state.

From the experimental results studied in Table 6, it can be concluded that the APR is flexibly and effectively operated within very wide range of SNR. Either the PACK or the PA2N or both of them are mitigated, depending on SNR and nRX. The PA2N is highly prioritized at very low SNR with the value of −10.0 dB, but the PACK receives higher compensation effort from the APR at 0.0 dB SNR.

The invention claimed is:

1. An autonomous power regulation (APR) method is composed of four steps:

step 1: sequence generation and reference calculation:

step 1.1: sequence generation:

at a physical layer (L1/PHY), a transmitted signal $X_{RS}$ is generated by decoding configurations sent from a media access control layer (L2/MAC); with L symbols in time domain, $X_{RS}$ is a matrix of all transmitted signal $$X_{RS}^{\{l\}}$$

at the symbol l:

$$X_{RS} = \bigcup_{l=1}^{L} X_{RS}^{\{l\}} = \left[ X_{RS}^{\{1\}} \; X_{RS}^{\{2\}} \; \dots \; X_{RS}^{\{L\}} \right]; \tag{1}$$

in frequency domain, each $$X_{RS}^{\{l\}}$$

is a matrix of all KRS subcarriers (SCs):

$$X_{RS}^{\{l\}} = \bigcup_{k=1}^{KRS} X_{RS}^{\{l,k\}} = \begin{bmatrix} X_{RS}^{\{l,1\}} \\ X_{RS}^{\{l,2\}} \\ \vdots \\ X_{RS}^{\{l,KRS\}} \end{bmatrix} = \begin{bmatrix} \mathrm{Re}\left[X_{RS}^{\{l,1\}}\right] + j\mathrm{Im}\left[X_{RS}^{\{l,1\}}\right] \\ \mathrm{Re}\left[X_{RS}^{\{l,2\}}\right] + j\mathrm{Im}\left[X_{RS}^{\{l,2\}}\right] \\ \vdots \\ \mathrm{Re}\left[X_{RS}^{\{l,KRS\}}\right] + j\mathrm{Im}\left[X_{RS}^{\{l,KRS\}}\right] \end{bmatrix}, \tag{2}$$

where the transmitted signal $$X_{RS}^{\{l,k\}}$$

is a complex number with real part (Re) and image part (Im), and j is the imaginary number;

step 1.2: reference calculation:

reference $$\left\| X_{RS}^{\{l\}} \right\|$$

of the transmitted signal is averaged value of all Re and Im parts on all KRS SCs at the symbol l:

$$\|X_{RS}^{\{l\}}\| = \frac{\sum_{k=1}^{KRS}|\mathrm{Re}\,[X_{RS}^{\{l,k\}}]| + \sum_{k=1}^{KRS}|\mathrm{Im}\,[X_{RS}^{\{l,k\}}]|}{2KRS}; \quad (3)$$

with L symbols in time domain, all $$\|X_{RS}^{\{l\}}\|$$

are combined as the general transmitted signal $\|X_{RS}\|$:

$$\|X_{RS}\| = \bigcup_{l=1}^{L}\|X_{RS}^{\{l\}}\| = [\|X_{RS}^{\{1\}}\|\ \|X_{RS}^{\{2\}}\|\ \dots\ \|X_{RS}^{\{L\}}\|]; \quad (4)$$

step 2: signal extraction and magnitude calculation:

step 2.1: signal extraction:

in space domain with R reception antennas, the received signal Y is a matrix of all received signal $Y^{\{r\}}$ on the reception antenna r:

$$Y = \bigcup_{r=1}^{R} Y^{\{r\}} = [Y^{\{1\}}\ Y^{\{2\}}\ \dots\ Y^{\{R\}}]; \quad (5)$$

in time domain with L symbols, each $Y^{\{r\}}$ is composed of all received signal $Y^{\{r,l\}}$ at the symbol l:

$$Y^{\{r\}} = \bigcup_{l=1}^{L} Y^{\{r,l\}} = [Y^{\{r,1\}}\ Y^{\{r,2\}}\ \dots\ Y^{\{r,L\}}]; \quad (6)$$

on the antenna r and at the symbol l, $Y^{\{r,l\}}$ contains two types of SC: demodulation reference signals (RS)

$$Y_{RS}^{\{r,l\}}$$

and data (DT)

$$Y_{DT}^{\{r,l\}}:$$

$$Y^{\{r,l\}} = Y_{RS}^{\{r,l\}} \cup Y_{DT}^{\{r,l\}}; \quad (7)$$

since RS and DT SCs are independent, $$Y_{RS}^{\{r,l\}} \text{ and } Y_{DT}^{\{r,l\}}$$

are autonomously processed:

$$Y_{RS}^{\{r,l\}} = \bigcup_{k=1}^{KRS} Y_{RS}^{\{r,l,k\}} = \begin{bmatrix} Y_{RS}^{\{r,l,1\}} \\ Y_{RS}^{\{r,l,2\}} \\ \vdots \\ Y_{RS}^{\{r,l,KRS\}} \end{bmatrix} = \begin{bmatrix} \mathrm{Re}\,[Y_{RS}^{\{r,l,1\}}] + j\,\mathrm{Im}\,[Y_{RS}^{\{r,l,1\}}] \\ \mathrm{Re}\,[Y_{RS}^{\{r,l,2\}}] + j\,\mathrm{Im}\,[Y_{RS}^{\{r,l,2\}}] \\ \vdots \\ \mathrm{Re}\,[Y_{RS}^{\{r,l,KRS\}}] + j\,\mathrm{Im}\,[Y_{RS}^{\{r,l,KRS\}}] \end{bmatrix}, \quad (8)$$

$$Y_{DT}^{\{r,l\}} = \quad (9)$$

$$\bigcup_{k=1}^{KDT} Y_{DT}^{\{r,l,k\}} = \begin{bmatrix} Y_{DT}^{\{r,l,1\}} \\ Y_{DT}^{\{r,l,2\}} \\ \vdots \\ Y_{DT}^{\{r,l,KDT\}} \end{bmatrix} = \begin{bmatrix} \mathrm{Re}\,[Y_{DT}^{\{r,l,1\}}] + j\,\mathrm{Im}\,[Y_{DT}^{\{r,l,1\}}] \\ \mathrm{Re}\,[Y_{DT}^{\{r,l,2\}}] + j\,\mathrm{Im}\,[Y_{DT}^{\{r,l,2\}}] \\ \vdots \\ \mathrm{Re}\,[Y_{DT}^{\{r,l,KDT\}}] + j\,\mathrm{Im}\,[Y_{DT}^{\{r,l,KDT\}}] \end{bmatrix},$$

where $$Y_{RS}^{\{r,l\}} \text{ and } Y_{DT}^{\{r,l\}}$$

are respectively the received signal at RS and DT SCs;

step 2.2: magnitude calculation:

on the antenna r, at the symbol l, and at the RS SCs, magnitude $$\|Y_{RS}^{\{r,l\}}\|$$

of the received signal is averaged value of all Re and Im parts on all KRS SCs:

$$\|Y_{RS}^{\{r,l\}}\| = \frac{\sum_{k=1}^{KRS}|\mathrm{Re}\,[Y_{RS}^{\{r,l,k\}}]| + \sum_{k=1}^{KRS}|\mathrm{Im}\,[Y_{RS}^{\{r,l,k\}}]|}{2\,KRS}; \quad (10)$$

on the antenna r, at the symbol l, and at the DT SCs, magnitude $$\|Y_{DT}^{\{r,l\}}\|$$

of the received signal is averaged value of all Re and Im parts on all KDT SCs:

$$\|Y_{DT}^{\{r,l\}}\| = \frac{\sum_{k=1}^{KDT}|\mathrm{Re}\,[Y_{DT}^{\{r,l,k\}}]| + \sum_{k=1}^{KDT}|\mathrm{Im}\,[Y_{DT}^{\{r,l,k\}}]|}{2\,KDT}; \quad (11)$$

step 3: threshold generation, gain calculation, and power regulation:

step 3.1: threshold generation:

from $$\|X_{RS}^{\{l\}}\|,$$

threshold THR at the symbol 1 is composed of n1 và n2:

$$THR \triangleq \left[\frac{\|X_{RS}^{(l)}\|}{2^{n1}}; 2^{n2}\|X_{RS}^{(l)}\|\right] \cap [2^1; 2^{13}], \tag{12}$$

where n1 and n2 are experimental parameters; simultaneously, THR is also saturated by the $[2^1; 2^{13}]$ range to avoid over floating in 16-bit calculation;

step 3.2: gain calculation:

a gain $nBit_{RS/DT}$ is obtained by comparing $$\|Y_{RS}^{(r,l)}\| \text{ and } \|Y_{DT}^{(r,l)}\|,$$

i.e. the $$\|Y_{RS/DT}^{(r,l)}\|,$$

with THR; when $$\|Y_{RS/DT}^{(r,l)}\|$$

is greater than upper limit of THR, it is required to reduce magnitude of the received signal; the updated magnitude of the received signal decreases two times in decimal:

$$\|Y_{RS/DT}^{(r,l)}\| = \frac{\|Y_{RS/DT}^{(r,l)}\|}{2}; \tag{13}$$

in binary, it means a lessened bit with new value of $nBit_{RS/DT}$:

$$nBit_{RS/DT} = nBit_{RS/DT} - 1; \tag{14}$$

to obtain a final gain, the reduction of magnitude and bit value is repeated until $$\|Y_{RS/DT}^{(r,l)}\|$$

is less than upper limit of THR;

on the contrary, when $$\|Y_{RS/DT}^{(r,l)}\|$$

is less than lower limit of THR, it is demanded to increase magnitude of the received signal; in decimal, the new received signal magnitude is two times greater than the old value:

$$\|Y_{RS/DT}^{(r,l)}\| = 2\|Y_{RS/DT}^{(r,l)}\|; \tag{15}$$

in binary, the gain $nBit_{RS/DT}$ is also increased by a bit:

$$nBit_{RS/DT} = nBit_{RS/DT} + 1; \tag{16}$$

repeating magnitude and bit value increase, the final gain $nBit_{RS/DT}$ is obtained once $$\|Y_{RS/DT}^{(r,l)}\|$$

is greater than lower limit of THR;

step 3.3: power regulation:

on the antenna r, and at the symbol l, the received signal $$\hat{Y}_{RS/DT}^{(r,l)}$$

is regulated by means of the gain and the original received signal $$Y_{RS/DT}^{(r,l)}:$$

$$\hat{Y}_{RS/DT}^{(r,l)} = 2^{nBit_{RS/DT}}\, Y_{RS/DT}^{(r,l)}; \tag{17}$$

on all L symbol, the regulated signal at RS SCs $$\hat{Y}_{RS}^{(r)}$$

is a matrix of all $$\hat{Y}_{RS}^{(r,l)}$$

$$\hat{Y}_{RS}^{(r)} = \bigcup_{l=1}^{L} \hat{Y}_{RS}^{(r,l)} = \left[\hat{Y}_{RS}^{(r,1)}\ \hat{Y}_{RS}^{(r,2)}\ \ldots\ \hat{Y}_{RS}^{(r,L)}\right]; \tag{18}$$

similarly, the regulated signal at DT SCs $$\hat{Y}_{DT}^{(r)}$$

is a matrix of all $$\hat{Y}_{DT}^{(r,l)}:$$

$$\hat{Y}_{DT}^{(r)} = \bigcup_{l=1}^{L} \hat{Y}_{DT}^{(r,l)} = \left[\hat{Y}_{DT}^{(r,l)}\ \hat{Y}_{DT}^{(r,2)}\ \ldots\ \hat{Y}_{DT}^{(r,L)}\right]; \tag{19}$$

step 4: channel estimation, channel equalization, channel decoder, and statistics:

at L1, $$\hat{Y}_{RS}^{(r)} \text{ and } \hat{Y}_{DT}^{(r)}$$

are used for channel estimation, channel equalization, and channel decoder to obtain required outputs such as channel state information and payload; payload is also utilized for decoding performance statistics with an acknowledgement missed detection probability (PACK) and an acknowledgement to negative-acknowledgement probability (PA2N); the APR is applicable under the weak signal, unbalanced received power, and not identical RS and DT SCs power conditions.

* * * * *